(12) United States Patent
Jensen et al.

(10) Patent No.: US 8,628,608 B2
(45) Date of Patent: Jan. 14, 2014

(54) APPARATUS AND METHOD FOR IN-SITU HIGH TEMPERATURE REGENERATION OF A ROTOR SORPTION CONCENTRATOR

(75) Inventors: Christopher P. Jensen, Stoneham, MA (US); Kevin Orff, Merrimac, MA (US); Frank Giles, Kingston, NH (US); Paul A. Dinnage, New Braunfels, TX (US)

(73) Assignee: Munters Corporation, Amesbury, MA (US)

(*) Notice: Subject to any disclaimer, the term of this patent is extended or adjusted under 35 U.S.C. 154(b) by 393 days.

(21) Appl. No.: 12/673,135

(22) PCT Filed: Sep. 12, 2008

(86) PCT No.: PCT/US2008/076131
§ 371 (c)(1),
(2), (4) Date: Mar. 26, 2010

(87) PCT Pub. No.: WO2009/036247
PCT Pub. Date: Mar. 19, 2009

(65) Prior Publication Data
US 2011/0209613 A1    Sep. 1, 2011

Related U.S. Application Data

(60) Provisional application No. 60/960,026, filed on Sep. 12, 2007.

(51) Int. Cl.
*B01D 53/02* (2006.01)

(52) U.S. Cl.
USPC ................. 96/115; 96/125; 96/143; 96/144; 96/146; 96/150; 95/113; 95/117; 95/123; 95/148; 62/94; 165/7

(58) Field of Classification Search
USPC ............ 95/113, 117, 123, 148; 96/115, 125, 96/143, 144, 146, 150; 62/94; 92/271; 165/7
See application file for complete search history.

(56) References Cited

U.S. PATENT DOCUMENTS

| | | | |
|---|---|---|---|
| 3,009,540 A * | 11/1961 | Munters ......................... | 95/113 |
| 3,889,742 A * | 6/1975 | Rush et al. ..................... | 96/144 |
| 4,409,006 A | 10/1983 | Mattia | |
| 5,212,956 A * | 5/1993 | Tsimerman ..................... | 62/94 |
| 5,512,083 A * | 4/1996 | Dunne ........................... | 95/113 |
| 5,649,428 A * | 7/1997 | Calton et al. .................... | 62/94 |
| 5,817,167 A * | 10/1998 | DesChamps .................... | 95/113 |
| 5,891,219 A * | 4/1999 | Klobucar et al. ............... | 95/113 |
| 6,199,392 B1 * | 3/2001 | Maeda ........................... | 62/180 |
| 6,328,787 B1 | 12/2001 | Yamauchi | |
| 7,101,414 B2 * | 9/2006 | Dinnage et al. ................. | 95/14 |

(Continued)

FOREIGN PATENT DOCUMENTS

| | | |
|---|---|---|
| DE | 39 02 977 | 8/1989 |
| DE | 10 2005 048 298 | 4/2007 |
| JP | H5 220336 | 8/1993 |

*Primary Examiner* — Christopher P Jones
(74) *Attorney, Agent, or Firm* — Fitzpatrick, Cella, Harper & Scinto

(57) ABSTRACT

A method and apparatus for regenerating the media of a rotary sorption concentrator system includes passing a 600° F. to 1000° F. regeneration fluid stream through a rotating media in a first isolated zone to regenerate the media and remove contaminants from the media that are not removed during a typical desorption cycle of a rotary sorption concentrator system.

29 Claims, 9 Drawing Sheets

(56) References Cited

U.S. PATENT DOCUMENTS

| | | |
|---|---|---|
| 2002/0169068 A1 | 11/2002 | Dai et al. |
| 2004/0076568 A1 | 4/2004 | Yan et al. |
| 2005/0235827 A1 | 10/2005 | Dinnage et al. |
| 2006/0042464 A1 | 3/2006 | Fujioka |
| 2006/0096454 A1 | 5/2006 | Farant et al. |
| 2012/0037002 A1* | 2/2012 | Frydman et al. ............... 96/118 |

* cited by examiner

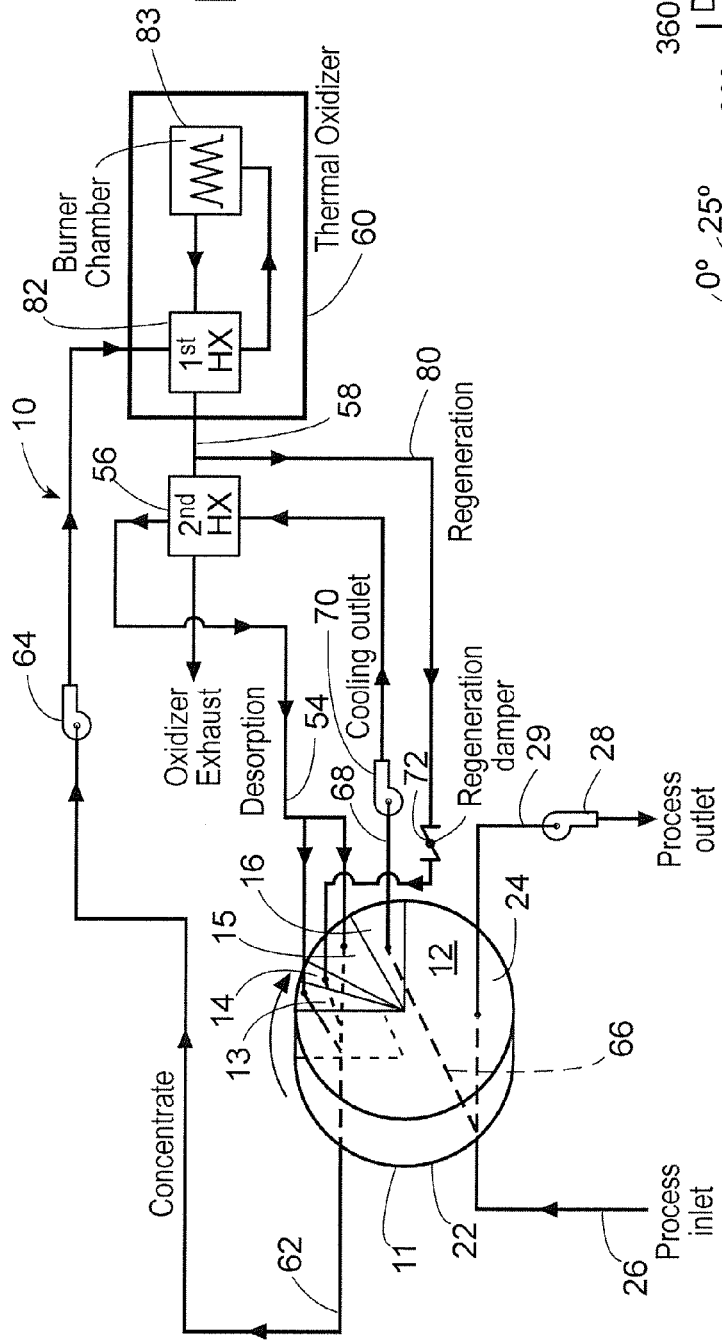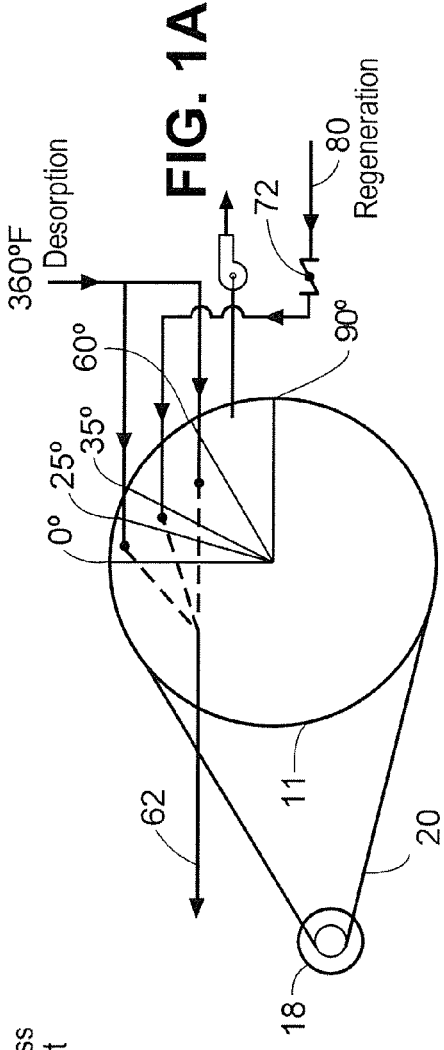

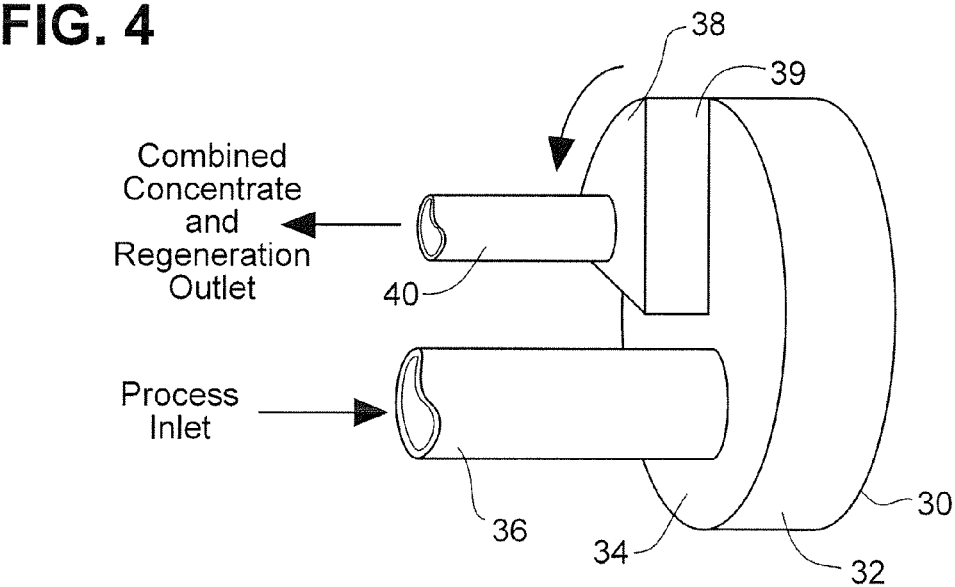
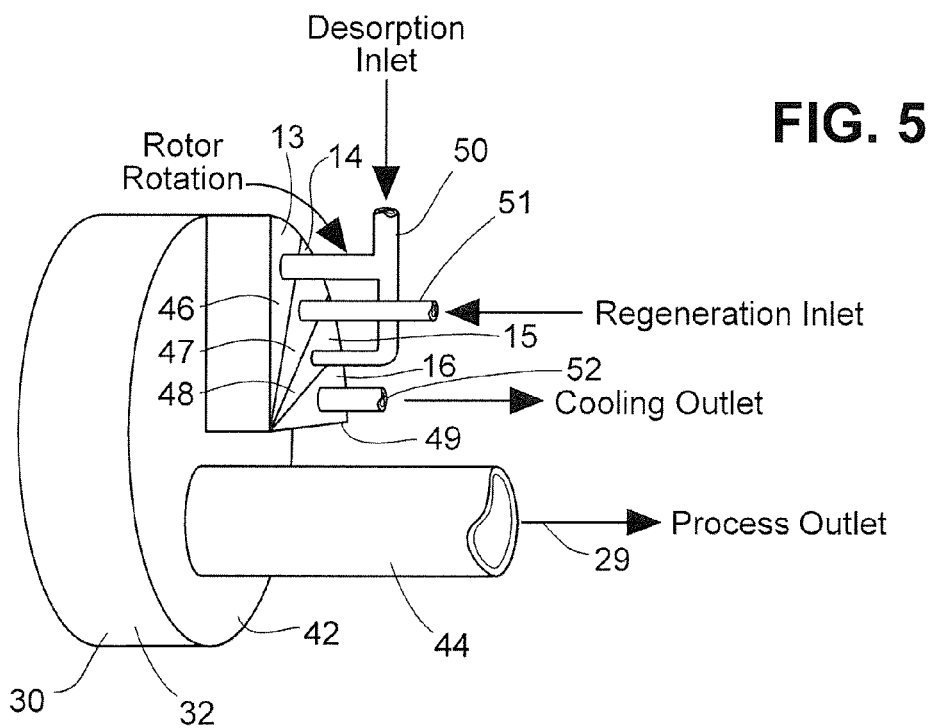

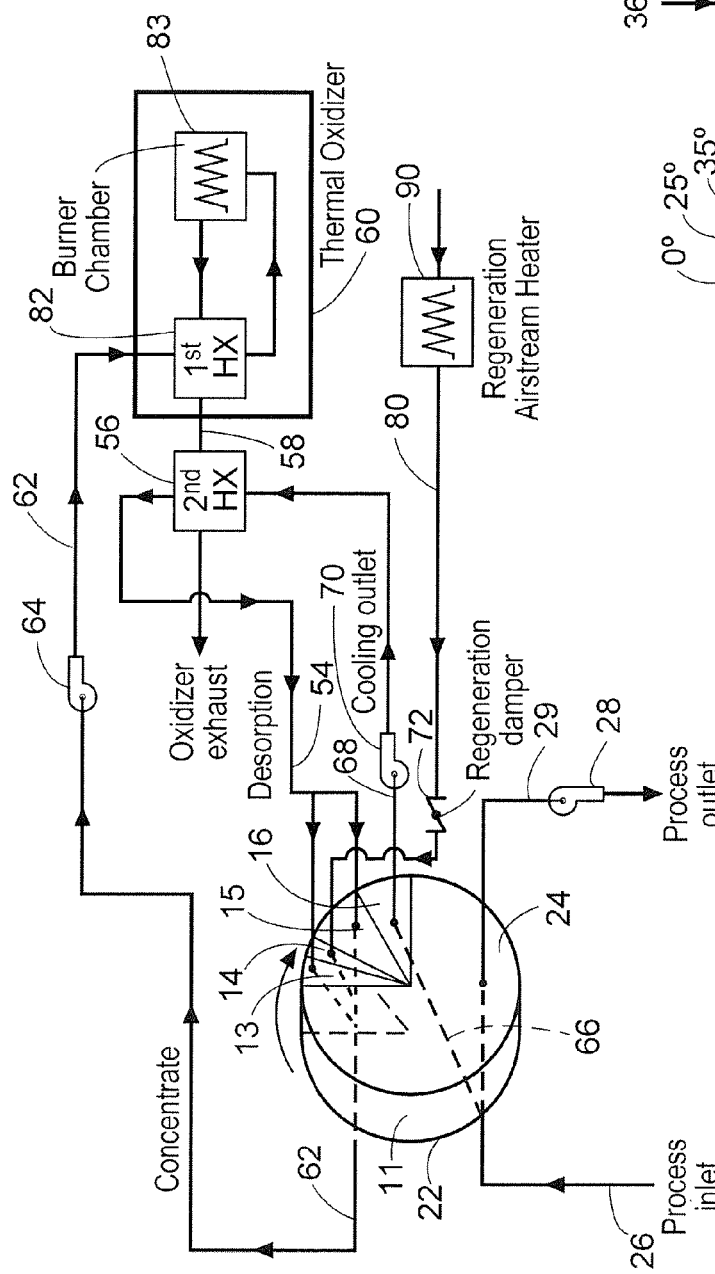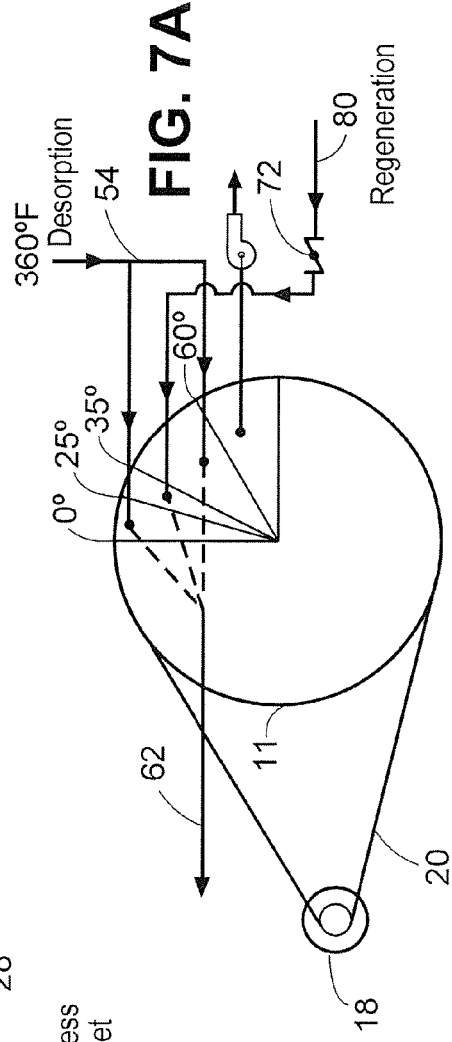

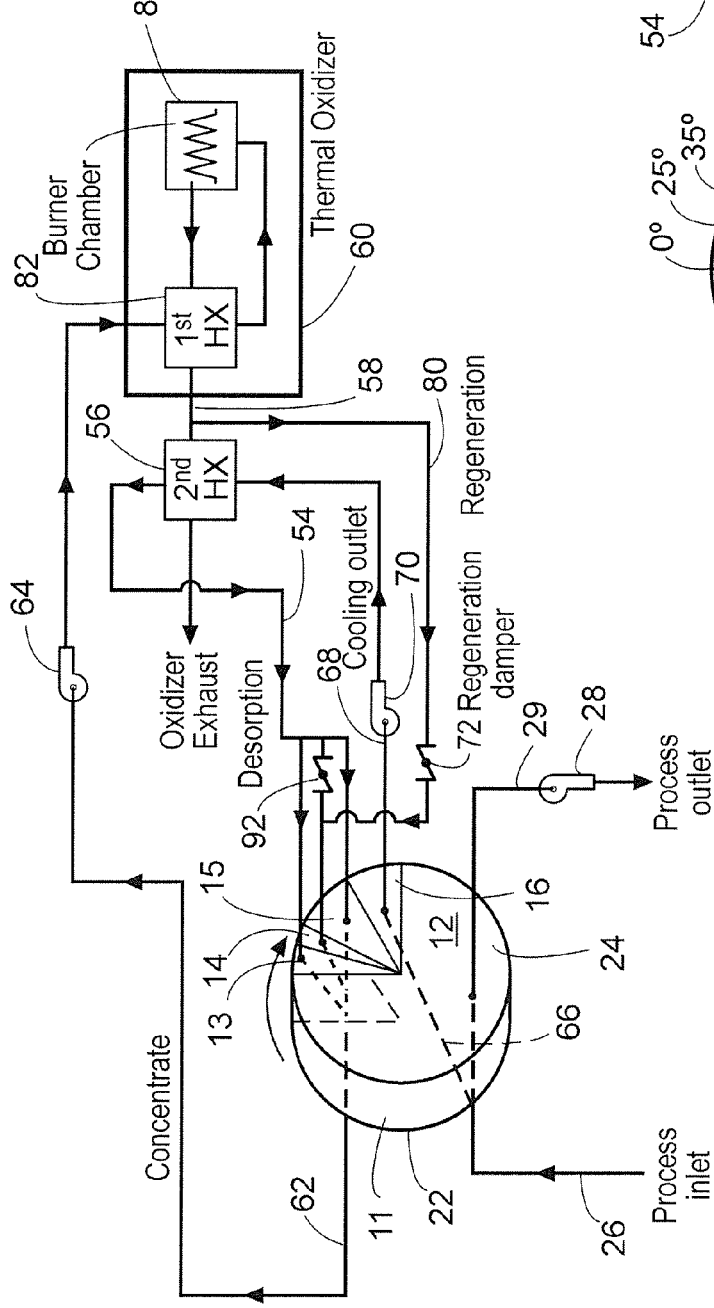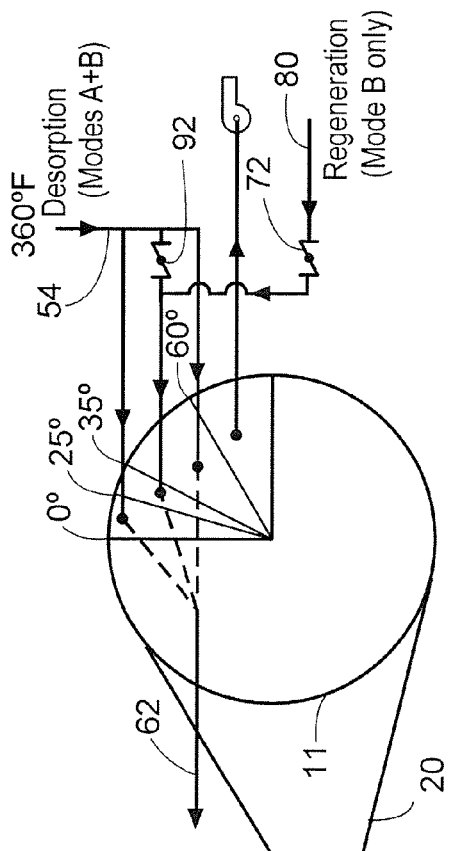

APPARATUS AND METHOD FOR IN-SITU HIGH TEMPERATURE REGENERATION OF A ROTOR SORPTION CONCENTRATOR

This application Claims the benefit of U.S. Provisional Application No. 60/960,026 filed Sep. 12, 2007.

BACKGROUND OF THE INVENTION

1. Field of the Invention

The present invention relates generally to a rotary sorption concentrator system and in particular, to a rotary bed sorption system that includes in-situ high temperature regeneration of the rotary concentrator adsorbent media.

2. Description of the Related Art

Rotary sorption concentrator systems have long been used in the art and uses an established technology. Such systems typically collect a sorbate from one fluid stream, sometimes called a process or sorption fluid stream, and transfer it in a more concentrated form to a second fluid stream, sometimes called a desorption fluid stream. Commonly removed sorbates includes volatile organic compounds ("VOCs").

Rotary concentrator technology offers concentrating abilities and operating efficiencies as compared to other techniques. It is particularly useful in low-concentration exhaust streams, where VOCs with low to medium range boiling points are present. Such exhaust streams occur, for example in semiconductor manufacturing and paint booth exhaust streams. The basic technology offers significant fuel savings, which is driving the industry to broaden the application base for rotor concentrators into treating exhaust streams containing high boiling point or polymerizing VOCs in their exhaust streams.

In a typical rotor concentrator system the adsorbent material or media is housed within a rotor housing which is divided into a plurality of rotor treatment zones and the rotor rotates in a cycle of operation on a continuous basis. The VOC-laden process airstream passes through the process zone where the VOCs are retained on the rotor media and cleaned process air exits the rotor.

After passing through the process zone, the rotor enters the desorption zone through which a desorption airstream passes. The desorption airstream is heated to a sufficient temperature (typically 250 to 400° F.) before entering the media and strips or re-volatilizes the VOCs from the rotor media. The desorption airstream is typically 1/10th of the volume of the process airstream, although smaller percentages are also commonly used. The desorption airstream is heated from a heat exchanger in the exhaust airstream of an oxidizer, which is a separate device in which heat is recovered, or other by methods. Once the desorption airstream exits the media, having entrained the VOCs, it is known as the concentrate airstream. This concentrate airstream is directed to the final treatment device, typically an oxidizer of known construction, which oxidizes the contaminants at a high temperature to form carbon dioxide ($CO_2$) and water which can be exhausted to the atmosphere.

With high boiling point VOCs, polymerizing VOCs (such as styrene) and other entrained contaminants (such as paint overspray) there is a concern that the VOCs may not be fully desorbed from the rotor adsorbent media under the normal operation mode of the system because the temperature of the desorption fluid stream of known systems is not sufficiently high. (Fluid in this context includes air or other gaseous streams.) Therefore, the retained compounds will block the adsorption sites in the adsorption media, reducing the media's adsorption efficiency. Clogging of the rotor media's substrate can also occur. That would increase the pressure drop across the rotor. Such a pressure increase can cause operational imbalances throughout the system and increase power consumption of the air moving devices. Removal of these VOCs and contaminants upstream of the rotor system may not be possible or may be undesirable, as it requires the additional expense, installation and maintenance of extra equipment (such as a condenser.)

In circumstances where VOCs and contaminants are retained in the rotor media despite the conventional desorption process, it is desirable to return the media to its original state, free of VOCs, contaminants, organics, etc. Such regeneration of the rotor media also avoids expensive replacement costs. To date, rotor concentrator media regeneration has typically been achieved through either a washing process or ex-situ heating process.

In order to remove excess contaminants from sorbate rotors, one prior U.S. Pat. No. 7,018,447, describes a method for washing the rotor in-situ while it is on-line. According to that patent, a washing agent is introduced into the desorption section of the rotor that is then rotated 360° plus a sector. Then that sector is washed. The method continues until all sectors have been washed. The wash is a mild detergent or acid. This process results in a liquid waste stream as a by-product of the process. The liquid waste stream needs to be collected from the housing of the equipment and then disposed of as hazardous waste. This requires additional collection equipment and the need for processes and procedures for disposal of the liquid waste.

In the more typical ex-situ heating process for cleaning rotors, the rotor media is physically removed from its housing and transported to another location. At that location, the media is exposed to a high temperature for a period of time required to remove the contaminants. This process requires a considerable labor expense and a significant amount of downtime for the system, while the rotor media is being treated. Permanent damage to the media, requiring replacement, is also possible with the ex-situ heating process if special handling procedures are not maintained or if the internal temperature of the media is not controlled properly.

SUMMARY OF THE INVENTION

It is an object of the present invention to provide in-situ high temperature regeneration of a rotary sorption media.

Another object of the present invention is to regenerate and/or clean a rotary sorption media in-situ without the creation of an additional waste stream.

Yet another object of the present invention is to provide in-situ regeneration of a rotary sorption media with reduced labor costs and reduced system down time.

The in-situ regeneration of a rotor concentrator system of this invention returns the rotor concentrator's adsorbent material or media to a near-original state, free of retained VOCs, organics or contaminants. This is done by increasing the temperature of a designated rotor treatment airstream and subjecting the rotor concentrator media to that higher temperature rotor treatment airstream in one or more segments of its cycle of operation, without having to remove the adsorbent media from the rotor concentrator. This higher temperature airstream will volatize, destroy or decompose the retained VOCs contaminates on the media and allows the contaminants to be exhausted from the rotor concentrator system. The exhausted airstream is then further treated or exhausted in a safe manner. The present invention uses time and temperature to ensure a complete and thorough regeneration of the media and is designed to regenerate the rotor with no additional waste streams.

In a preferred embodiment of the present invention, a separate rotor treatment zone is designated for the regeneration step of the invention. This regeneration zone is located within the portion of the rotor's existing desorption inlet section of the rotor housing. During the regeneration cycle of operation, a high temperature (typically 600° F. to 1000° F.) airstream is introduced into the regeneration zone. This high temperature airstream is referred to herein as the regeneration airstream. This regeneration airstream is taken from the exhaust stream of an oxidizer used with the system.

In other embodiments, the regeneration airstream is taken from a separate heating device. There are many options for the source of this heated regeneration airstream. The ideal layout will derive from the integrated system. The requirements of the rotor concentrator system will determine the heating device for the desorption airstream and the final treatment device for the concentrate airstream, which can then be designed to include the enhanced components and operation of the present invention. A person familiar with this technology will adapt the regeneration airstream heating device based on the components in the integrated rotor concentrator system, available heat and energy sources at the rotor concentrator system site and the overall requirements of the rotor concentrator system.

Still other embodiments of the present invention will include different locations within the rotor concentrator housing for the regeneration zone. There are many possible locations for the regeneration zone to be designed within the rotor housing (including systems with multiple rotor treatment zones as described in U.S. Pat. No. 6,328,787). The present invention may be permanently mounted in the rotor concentrator system or may consist of removable components that can be installed as required.

As used herein, "cycle of operation" means a path of movement of the sorbent mass during which the sorbent mass undergoes both a sorption and desorption process. The term "sequentially" refers to a relative order, but does not necessarily require that one immediately follow another. For example, even if another zone of a rotor were interposed between a "first zone" and a "second zone", it would still be accurate to say that the sorbent mass or media sequentially passes through the first zone, the second zone and so on.

The in-situ regeneration system of the present invention for the rotor media offers considerable advantages over the existing prior art. This innovation does not result in the generation of any additional waste streams requiring separate disposal. It also eliminates or significantly reduces labor expenses and reduces system downtime. The regeneration process can be operated when desired. Alternatively, system controls can be programmed to automatically operate the regeneration process at pre-determined intervals, during a routine maintenance shutdown or on a continuous basis.

The above and other objects, features and advantages of the present invention will be apparent to those skilled in the art from the following detailed description of the present invention when read in conjunction with the accompanying drawings wherein.

BRIEF DESCRIPTION OF THE DRAWINGS

FIG. 1 is a schematic flow diagram of a preferred embodiment of the present invention of a rotor sorption concentrator system in accordance with the present invention;

FIG. 1A is an enlarged plan view of the rotor shown in FIG. 1 and associated fluid streams;

FIG. 4 is a schematic perspective view of the duct connections on the "front" face of the rotor;

FIG. 5 is a schematic perspective view of the duct connections on the "back" face of the rotor;

FIG. 7 is a schematic flow diagram similar to FIG. 1 of another embodiment of the present invention, wherein the regeneration heat is derived from a dedicated heating source and the source of the regeneration fluid stream is independent of the sorption process;

FIG. 7A is an enlarged plan view similar to FIG. 1A of the embodiment of FIG. 7;

FIG. 10 is a schematic flow diagram similar to FIG. 1 of a further embodiment of the present invention, wherein the regeneration zone can be used as both a regeneration zone or desorption zone;

FIG. 10A is an enlarged plan view similar to FIG. 1a of the embodiment of FIG. 10.

DETAILED DESCRIPTION OF THE PREFERRED EMBODIMENTS

Figure 2:
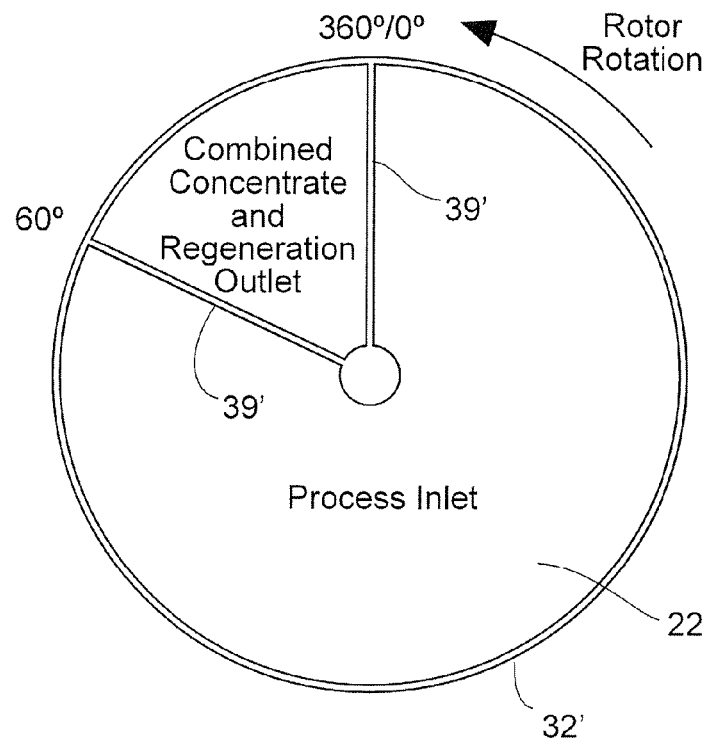
FIG. 2 is a plan view of the "front" face of the rotor in the preferred embodiment, i.e. the side of the rotor media where the process airstream enters the media, and showing the details of the rotor treatment zones.

Referring now to the drawings and initially to FIG. 1, a first preferred embodiment of a rotary sorption concentrator system 10 in accordance with the present invention is illustrated. The system includes a rotating disk-shaped mass 11 of conventional construction containing or coated with a regenerable sorbent material that, in a cycle of operation, passes through a plurality of zones 12-16 as described hereinafter.

Disk 11 is a rotary adsorbent media (hereinafter sometimes referred to as the "media") supported in a rotor housing that defines a plurality of treatment zones 12-16 with the largest being the process zone 12. The rotary media is rotatably mounted in the housing (not seen in FIG. 1) and is rotated about its central axis by a motor 18 and belt 20 or in any other convenient manner as would be apparent to those skilled in the art.

Media 11 consists of a known substrate such as corrugated sheet material which is impregnated with a VOC adsorbent such as zeolite or the like. The substrate is constructed so as to allow air to flow through the media in a direction generally parallel it to its axis of rotation from its front face 22 to its back face 24.

A VOC laden process inlet stream 26 from any known source is drawn into the rotary media 11 by a fan 28 to flow through the first process zone 12 defined by the surrounding housing as the rotor slowly rotates therein. The sorbent material, e.g., zeolite, sorbs (loads, retains) the VOCs from airstream 26 and cleaned process air leaves the back side of the housing as stream 29 and is discharged to the atmosphere or recycled, as is known in the art.

FIG. 4 schematically illustrates housing 30 which surrounds the media. The housing has a periphery 32 and front side 34 showing an inlet duct 36 for the VOC laden process inlet stream 26 supplying that stream to the zone 12. The Figure also shows the outlet plenum 38 of the housing for the concentrate air stream and the regeneration air streams leaving zones 13-16 and its associated return duct 40. As is known in the art seals in the housing 32 at the location of the side walls 39 of the outlet plenum 38 separate the process zone 12 from the zones 13-15. These seals are shown in FIG. 2 at 39' along with a peripheral edge seal 32'.

Figure 3:
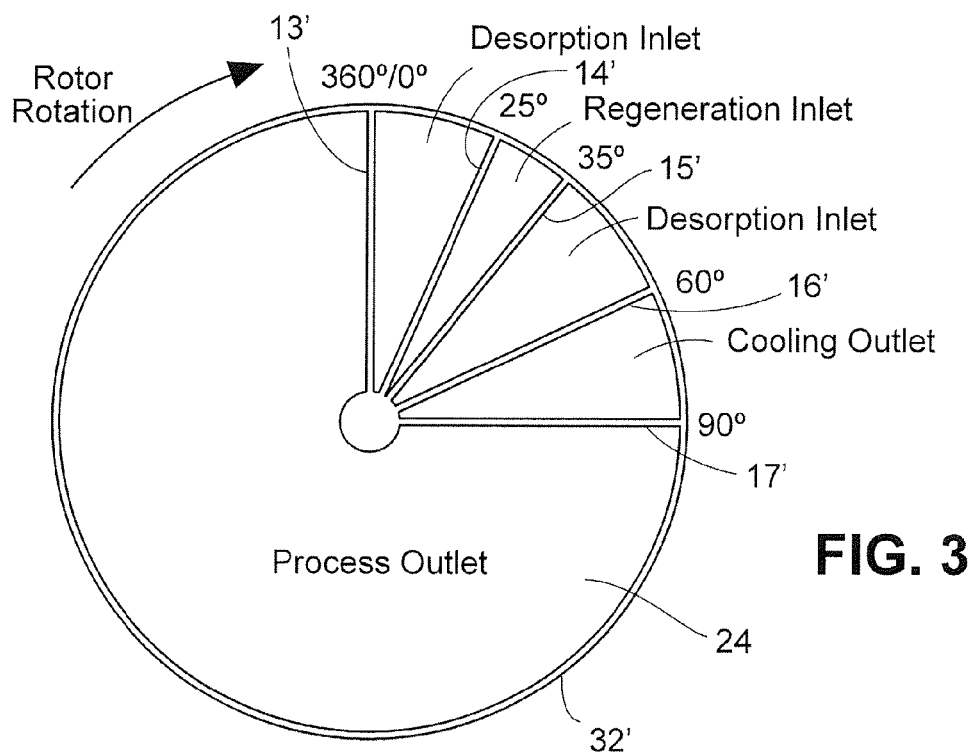
FIG. 3 is a plan view of the "back" face of the rotor in the preferred embodiment, i.e. the side of the rotor media where the process airstream exits the media, and showing the details of the rotor treatment zones.

FIG. 5 illustrates the back side 42 of the housing 30 and the process outlet duct 44 receiving cleaned air steam 29 discharged from process zone 12. It also shows the inlet supply plenum 49 for zones 13-16 which is divided by walls 46-48 into the separate zones 13-16 and their associated desorption, regeneration and cooling airstream ducts 50, 51 and 52 as described hereinafter. FIG. 3 illustrates the seals 13', 14', 15', 16' and 17' on the inside of the housing at the back face of media 12 which separate the zones 13-16, along with a peripheral seal 32'. The construction and operation of such seals is well known in the art. It will be understood that the location of the various zones of the plenum 49 can be varied by using other plenum slopes with other zone arrangements of the various embodiments described hereinafter.

Referring again to FIG. 1 and also to FIG. 1A, the media 11 is rotated clockwise and passes from the process zone 12 sequentially into the desorption zones 13 and 15. In rotor concentrator systems without the present invention, the desorption zone is typically a single combined zone.

A desorption airstream 54 is supplied to the desorption zones 13 and 15 from duct 50 as shown in FIG. 5. This airstream is heated, as described hereinafter, to a sufficient temperature (250 to 400° F.) to volatilize the majority of the adsorbed VOCs. As this heated airstream passes over the VOC-laden media in the desorption zones 13 and 15, it also warms the media. The VOCs are removed from the media and entrained in the desorption airstream 54 supplied from the duct 50. The desorption airstream is typically 1/10th or less of the volume of the process airstream. In typical rotor concentrator systems, without the present invention, zones 13 and 15 are combined into a single zone.

As shown in FIG. 1, the energy to warm the desorption airstream is obtained from a secondary heat exchanger 56 on the exhaust 58 of a thermal oxidizer 60. In other embodiments other heating sources may be used.

Upon exiting the media, the desorption airstream 54 with the entrained VOCs is referred to as the concentrate airstream 62. The concentrate airstream 62 is directed to the final treatment device, i.e., the thermal oxidizer 60 by fan 64.

In its cycle of operation, the media continues to rotate it passes from the desorption zones 13 and 15 into the cooling zone 16. A portion of the process airstream 26 is directed into the cooling zone 16 as shown by dotted line 66 in FIG. 4. This is the result of the overlap of the process zone 12 on the front face of the rotor with the cooling zone 16 on the back face, as is apparent by comparing FIGS. 4 and 5, as well as from the corrugated/fluted characteristics of the media. This portion of the process air serves as the cooling airstream 68. The cooling airstream cools the media, which is at an elevated temperature from having been in the desorption zone, as it passes through the media in the cooling zone 16. This process conditions the media to optimally adsorb VOCs again from the process airstream when it again enters process zone 12. The cooling airstream is warmed by the latent heat of the media as it passes through the media in cooling zone 16. This cooling airstream is supplied to the heater 56 by fan 70 and forms the desorption airstream 56.

In the preferred embodiment of the present invention the rotor treatment or regeneration zone 14 is provided and located adjacent to the first desorption zone 13 and second desorption zone 15. In a typical mode of operation (Mode A), when the system is on-line (i.e., when process air is flowing through the media and the media is adsorbing VOCs from the process airstream 26) and the media does not require regeneration, the regeneration zone 14 is isolated and made non-functioning by closing a regeneration damper 72 in the duct work that supplies a regeneration airstream to duct 51 and zone 14.

When the media 11 needs to be regenerated, the regeneration cycle (Mode B) of the rotor concentrator is activated. In the regeneration cycle, the regeneration valve or damper 72 is opened. This directs a high temperature regeneration airstream 80 into the regeneration zone 14. The regeneration airstream is taken from the thermal oxidizer 60 outlet exhaust 58 between a heat exchange 82 in the oxidizer and the external heat exchanger 56.

Oxidizer 60 is of known construction and receives the concentrate airstream 62 from fan 64. The concentrate airstream first enters heat exchanger 82 and then passes to a burner chamber 83 which converts the VOCs to $CO_2$ and water in a known manner. The hot airstream from the burner chamber 83 enters heat exchanger 82 where it heats the concentrate airstream before it enters the burner chamber 83. That airstream leaves then the oxidizer as its exhaust airstream 58 and enters the heat exchanger 56 where it gives up heat to the cooling airstream 68 to raise its temperature to 250° F. to 400° F. The exhaust airstream 58, between the oxidizer 60 and heat exchanger 56, has a very high temperature of 600° F. to 1000° F. and a portion is supplied as the regeneration airstream 80 when damper 72 is opened.

During a revolution of the media in a regeneration cycle, the media passes through the process zone 12, then enters the first desorption zone 13, where the media is heated to 250° F. to 400° F. by the desorption airstream 54 supplied from heater 56. This has two purposes—to remove VOCs from the media and to pre-heat the media to minimize the energy required in the regeneration zone 14. The media then rotates into the regeneration zone 14, where it is exposed to the high temperature (600° F. to 1000° F.) regeneration airstream 80 from the oxidizer exhaust airstream 58 of oxidizer 60 and heat exchanger 82. In regeneration zone 14, the media is warmed to 600° F. to 1000° F., which will volatize, destroy or decompose the retained organics and contaminants on the media.

Regeneration zone 14 is shown as a 10° angle segment. The regeneration airstream is sized to ensure that media exiting the regeneration zone will have been maintained at the necessary temperature and time to volatize, destroy or decompose the retained organics and contaminates on the media.

A further means of ensuring that the regeneration temperature and time are properly maintained is to reduce the speed of rotation of the rotor wheel during the regeneration cycle to 1 revolution per hour (RPH). This is done in any convenient manner using an RPH controller or the like for motor 18 as would be understood by those skilled in the art.

After the media 11 rotates through regeneration zone 14, it enters the second desorption zone 15. In the second desorption zone, additional desorption air (at 250° F. to 400° F.) is passed through the media to cool the media and reduce the impact of thermal stresses on the media and media support material of the housing. The media continues to rotate into the cooling zone 16 and then to the process zone 12. The regeneration cycle is operated until all of the media has passed through the active regeneration zone at least once. The regeneration cycle can be pre-programmed within the system's controls to occur automatically, without the need for operator involvement, or performed manually when required as would be apparent to those skilled in the art.

Figure 6:
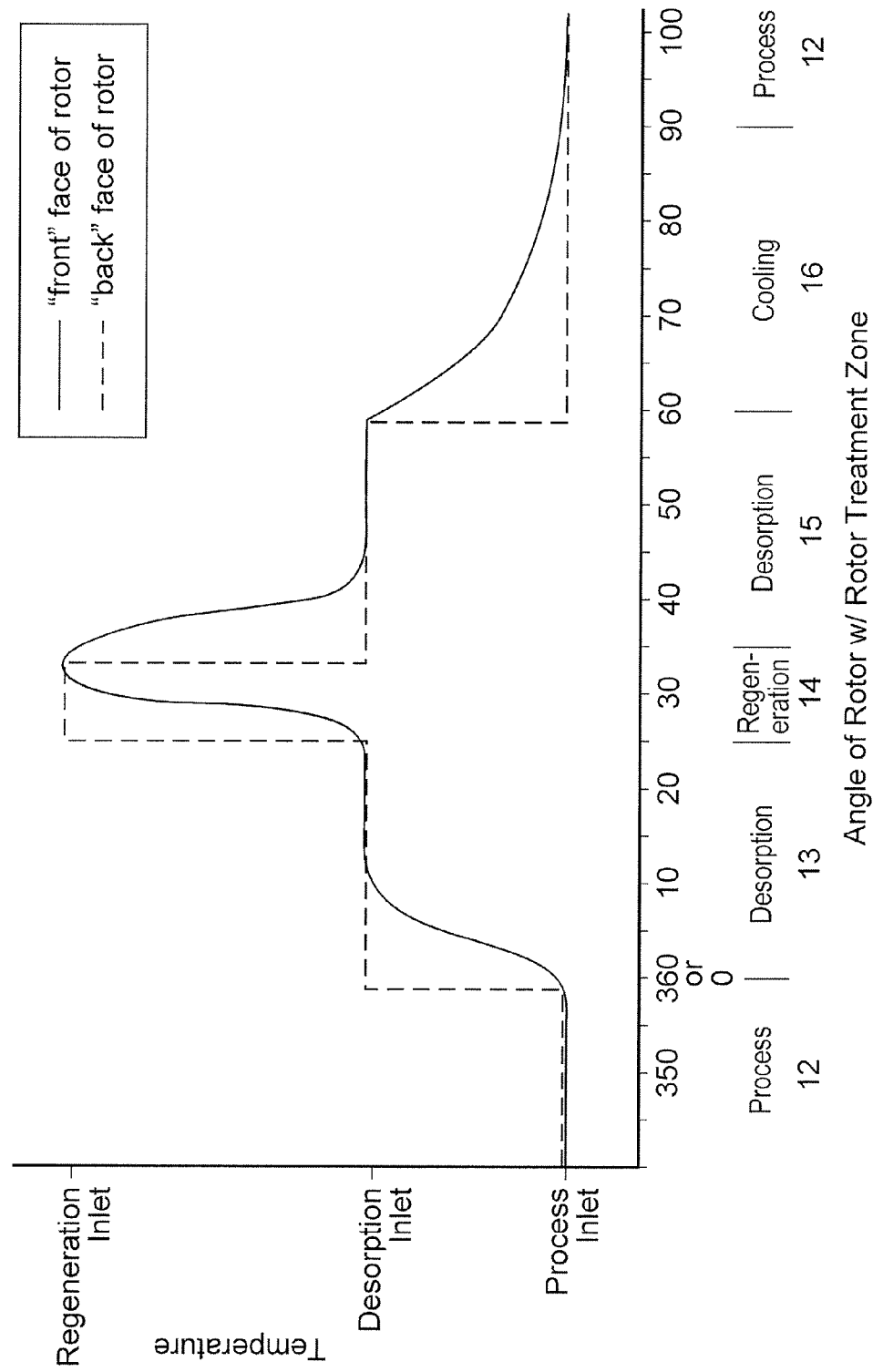
FIG. 6 is a chart illustrating the media temperatures experienced on the "front" and "back" of the rotor media as it rotates in its cycle of operation through the process, desorption, cooling and regeneration zones during a regeneration cycle.

FIG. 6 illustrates specific details of the temperature of media 11 as it rotates through the various rotor treatment zones during the regeneration cycle in the preferred embodiments. Other embodiments of this invention will have different temperature details depending on the location of the regeneration zone and the temperature of the surrounding zones. The solid line in the chart represents the media temperature at the front face and the dotted line the media temperature at the rear face during a cycle of operation. As noted above, the "front" face of the rotor media is the face of the media that the process airstream enters and the concentrate and regeneration airstreams leave the media. The "back" face of the rotor media is the face opposite the "front" face of the media that the process airstreams leave and the desorption and regeneration airstreams enter the media. In the rotor treatment zones 13-16, there is a significant delay in warming and cooling the media on the face where the airstream exits, due to the specific heat of the media and latent heat of any adsorb compounds on the media. In the process zone (90° to 360°/0° angle segment of the media) the media temperatures at the front and back are in equilibrium with the process air temperature (50° to 110° F.). As the media rotates into the first desorption zone 13 (360°/0° to 25° angle segment), the back is exposed to the desorption airstream and is quickly warmed to desorption airstream temperature (250° to 400° F.). The media on the front does not warm to the desorption airstream temperature (250° to 400° F.) until it is closer to exiting the first desorption zone. The media continues to rotate into the regeneration zone 14 (25° to 35° angle segment), where the back is exposed to the regeneration airstream and is quickly warmed to the regeneration airstream temperature (600° to 1000° F.). The media on the front does not warm to the regeneration airstream temperature (600° F. to 1000° F.) until it is closer to exiting the regeneration zone 14. The media then rotates into the second desorption zone 15, where the back is again exposed to the desorption airstream 54 and quickly cooled to the desorption airstream temperature (250° to 400° F.). The media on the front does not cool to the desorption airstream temperature (250° to 400° F.) until it is closer to exiting the second desorption zone 15. The media continues to rotate into the cooling zone 16, where the front of the media is exposed to the portion 66 of the process airstream that will become the cooling airstream 68. The front of the media is quickly cooled to the process temperature ((50° to 110° F.). The media on the back does not cool to the process temperature (250° to 400° F.) until it is closer to exiting the cooling zone. The media then rotates into the process zone 12 where the cycle repeats until the regeneration cycle is discontinued.

For simplicity purposes, the sealing areas provided by the rotor housing, as described above, between rotor treatment zones are considered to be negligible and are included in the angles for each rotor treatment zones.

All parameters for the present invention, e.g., dimensions, angles, speeds, temperatures, etc., used in this description are for purposes of clarity. A person skilled in the art can adapt this technology to use different parameters to achieve a balance between the media rotation speed, size of the rotor treatment zones (including the regeneration zone), system airflow rates (including the regeneration airstream) and system airstream temperatures (including the regeneration airstream temperature) in order to heat and cool the media to achieve proper regeneration and to maintain system integrity in view of the high temperatures used in the regeneration zone.

FIG. 7 illustrates another embodiment of the present invention in which the source of the regeneration airflow is independent of the sorption process and heated using an alternative heating device instead of the oxidizer. The alternate heating device is shown as heater 90 (i.e., a heating source independent of the oxidizer or another internal heater used in the desorption system) could be a dedicated device, such as an electric or gas regeneration airstream heater. The source of air entering the regeneration heater 90 in the embodiment shown in FIG. 7, is an ambient airstream (from the air surrounding the system). The source of the air entering the regeneration heater could also be another rotor treatment zone airstream, a manufactured airstream (from a nitrogen generation system) or another available airstream located at the site at which the system is located. As seen in the FIG. 7 embodiment the concentrate airstream 62 is returned by the heater 82 to the oxidizer, passes through the heat exchanger 82 and the burner chamber 83 of the oxidizer before passing again through heat exchanger 82 to heat exchanger 56. Unlike the embodiment of FIG. 1, the regeneration airstream 80 is not taken from the oxidizer exhaust 58. Instead the independent heater 90 is used to heat an air stream from another source to create the regeneration air stream 80 supplied through damper 72 during the regeneration cycle to the regeneration zone 14. One of the advantages of using a dedicated regeneration airstream heater is the ability to tailor the regeneration airstream, such as using an inert gas for the regeneration airstream if potential flammable conditions are anticipated during the regeneration cycle. There are many options for the method of heating the regeneration airstream. A person familiar with this technology will adapt the source of the regeneration airstream 80 and the regeneration airstream 90 heating device based on the components in the integrated rotor concentrator system, available heat and energy sources at the rotor concentrator system location and overall requirements of the rotor concentrator system.

Figure 8:
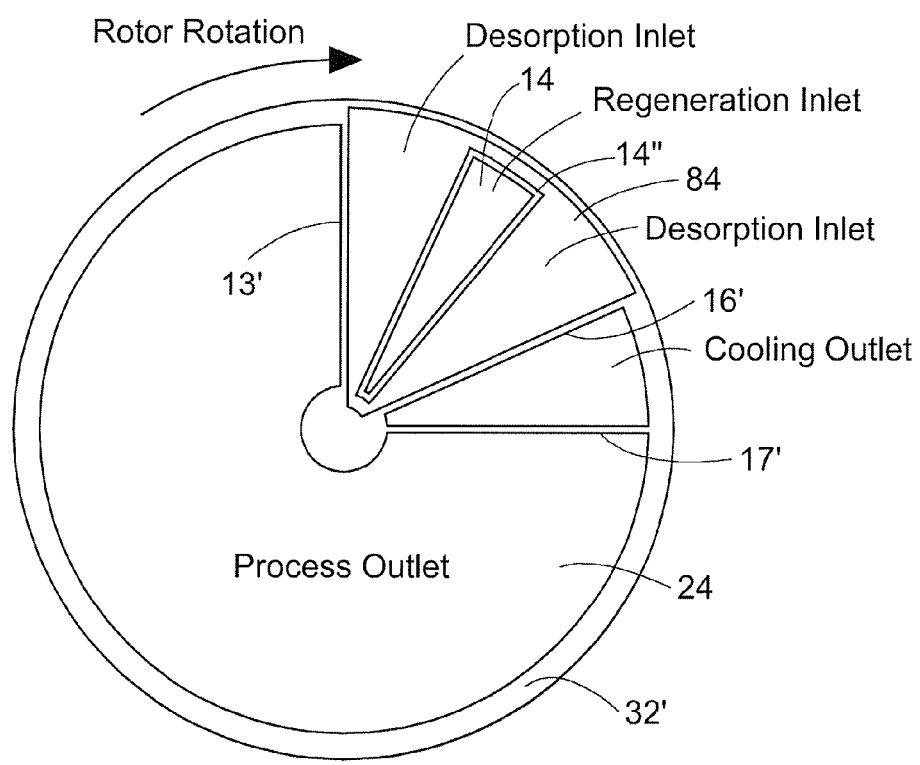
FIG. 8 is a plan view similar to FIG. 3 of the "back" face of the rotor of another embodiment of the present invention wherein the regeneration zone is embedded within the desorption zone.

Another embodiment of the present invention is illustrated in FIG. 8 wherein the regeneration zone is embedded within the desorption rotor treatment zone of the rotor concentrator system. FIG. 8 shows one method of embedding the regeneration zone within the desorption zone wherein the zone 14 is within the single larger desorption zone 84. As seen in FIG. 8 a wedge shaped seal 14" is provided on the inside of the rotor housing facing the media to form the regeneration zone 14.

The embodiment of FIG. 8 may be advantageous when the heat and energy of the regeneration airstream and regeneration components may compromise system integrity or cause other rotor concentrator system components to be damaged either through leakage, radiation, conduction or convection. Embedding the regeneration zone in this way, within another rotor treatment zone such as the desorption zone, allows cooler air to surround the regeneration zone to provide a buffer area. This confines the heat and energy of the regeneration to those components that are capable of handling the elevated temperatures. When embedding the regeneration zone within another zone, it is important to have the area of the media treated by the regeneration zone in a regeneration cycle match or extend beyond the area of media available to adsorbing VOC.

Figure 9:
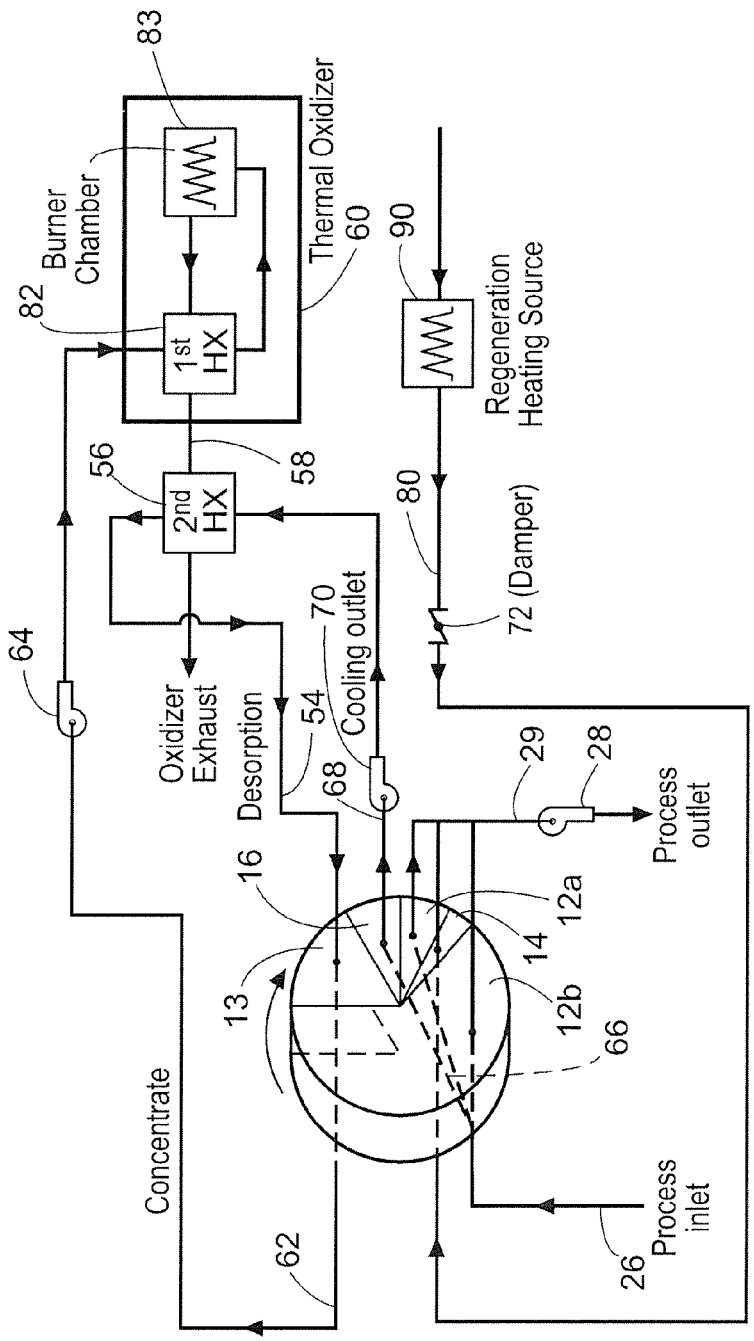
FIG. 9 is a schematic flow diagram similar to FIG. 1 of another embodiment of the present invention, wherein the regeneration zone is located in the process zone.

FIG. 9 illustrates another embodiment of the present invention, in which the regeneration zone 14 is isolated within or located adjacent to any rotor treatment zone, such as the process zone, the cooling zone or the desorption zone. There are many possible locations for the regeneration zone within the rotor housing (including any one of the plurality of rotor treatment zones in the system described in U.S. Pat. No. 6,328,787). In FIG. 9 a method of locating the regeneration zone 14 so that it is adjacent to a first process zone 12a and a second larger process zone 12b. This system may be advantageous when the regeneration zone needs to be more accessible or when other airstreams are better able to assist in heating and cooling the media, to achieve proper regeneration and to maintain system integrity during the regeneration cycle.

FIGS. 10 and 10A illustrate another embodiment of the present invention, wherein the regeneration zone is reused as a different rotor treatment zone when the system is not in a regeneration cycle (Mode B). In this case, the regeneration zone 14 is used as a rotor treatment zone for which it is isolated within or adjacent to, but can also be reused as any of the many possible rotor treatment zones that are part of various embodiments of the rotor concentrator technology. As seen in FIG. 10, the basic rotor concentrator with the preferred embodiment of the present invention of FIG. 1 is integrated within it to allow the regeneration zone 14 to direct desorption air at the media. During the typical mode of operation of the rotor concentrator (Mode A), the regeneration damper 72 is closed and a separate regeneration isolation damper 92 connected between the desorption airstream 54 and regeneration zone 14 is opened to allow desorption air to enter the zone 14. This allows the desorption airstream to be directed to the media. During the regeneration cycle (Mode B), the regeneration damper 72 is opened and the regeneration isolation damper 92 is closed, which allows the regeneration airstream 80 to be directed to the media. The ability to reuse the regeneration zone as another rotor treatment zone is advantageous since it allows the area of media in the regeneration zone to be available for other purposes, which may improve the rotor concentrator system's performance.

Figure 11:
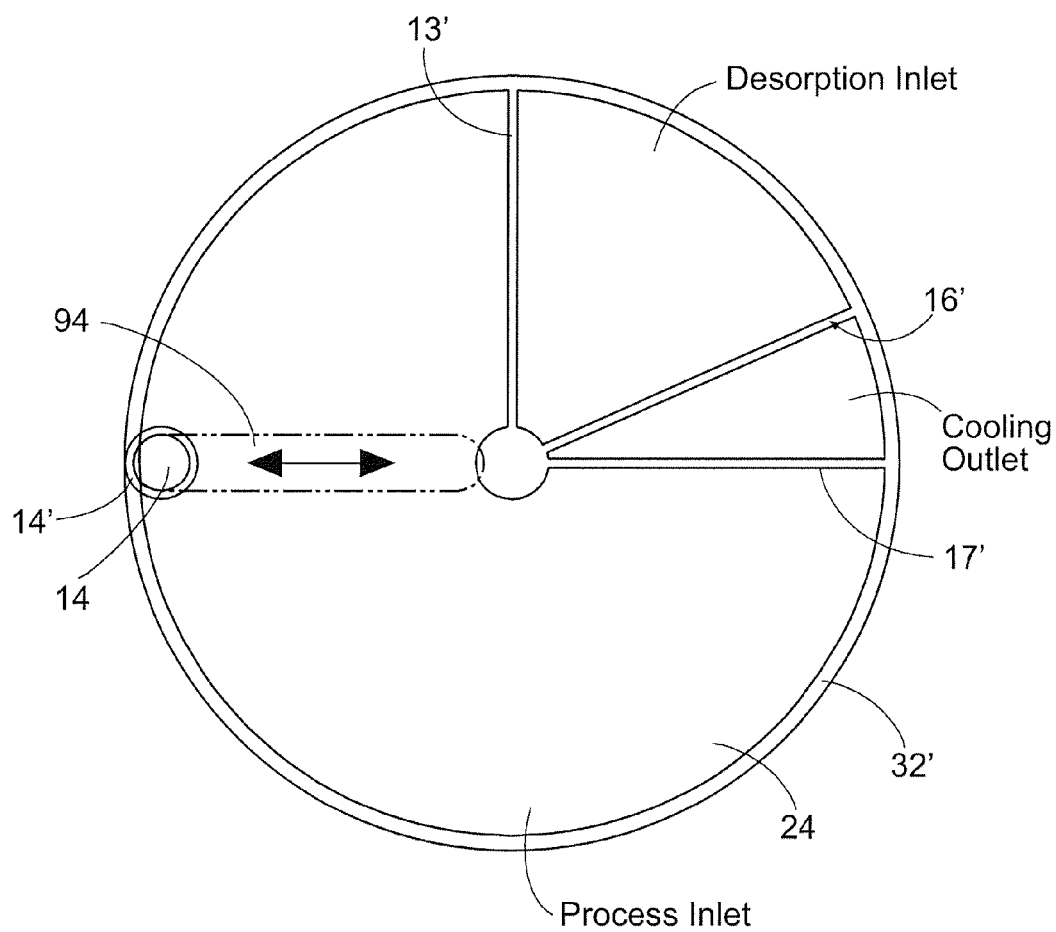
FIG. 11 is a plan view similar to FIG. 3 of the "back" face of the rotor of another embodiment of the present invention wherein the regeneration zone is embedded within the process zone but can be moved along a radial path from the perimeter to the center of the media.

FIG. 11 shows another embodiment of the present invention wherein the regeneration zone 14 is shown embedded in the process zone but has a smaller area than in previous embodiments. As described earlier, the regeneration zone is surrounded by a seal 14". In this embodiment the regeneration zone is allowed to move along a radial regeneration path 94 to allow the regeneration zone 14 to treat all of the media. The movement of the regeneration zone can be done manually or by automated equipment. During the regeneration cycle for this embodiment, the regeneration zone 14 starts out along the perimeter of the media. A regeneration airstream is supplied to the regeneration zone by methods described earlier and the media is rotated past the regeneration zone. After the media has made a full rotation, the regeneration zone 14, is incrementally moved toward the center of the media. This can be done by moving the seal 14" and its associated plenum and duct work as would be understood by those skilled in the art. The supply of regeneration airstream to the regeneration zone 14, the incremental movement of the regeneration zone 14 along the regeneration path 94 and the rotation of the media continues until the regeneration zone 14 completed the regeneration path and successfully regenerated all of the media.

In the above described preferred embodiments of the present invention all of the components are permanently integrated within the rotor concentrator system. In other embodiments, one or more components (e.g., air moving devices, heaters) may be removable and installed as required. Having removable components may be advantageous in circumstances where there are multiple rotor concentrator systems at a location that require a regeneration cycle, to retro-fit existing systems, to restore system performance after an anomaly or other possible needs.

It will be understood that the process and system of the invention can be varied by controlling the speed of rotation of the media, the size of the regeneration zone and/or the volume of the regeneration fluid airstream, as well as the specific operation temperature to treat various contaminants and operating conditions.

Other embodiments of the present invention may split the regeneration zone into multiple independent regeneration zones. This split may be radial, angular or in any other direction. The splitting of the regeneration zone may be advantageous if there is limited energy in the regeneration airstream, to achieve a desired system balance, to maintain system integrity, to shorten the regeneration cycle time or for other reasons. When splitting the regeneration zone, the operation of the regeneration cycle should insure that each individual regeneration zone is operated in such a way that the media, for which the regeneration zone was designed to treat, is properly regenerated.

Still other embodiments of the rotor concentrator without this invention may have additional or different rotor treatment zones, airstreams or operating methods. In addition, other embodiments of the rotor concentrator without this invention may have the media arranged in a different orientation, such as cylindrical or drum shape rather than the disc shape described below. For each of the variations in rotor concentrator technology, the various embodiments of the present inventions can be applied.

It is noted that the regeneration processes described above are intended to be performed while the system is treating contaminated process air or non-contaminated process airstream. It is to be understood that the regeneration process can be performed while the system is offline without process that creates the contaminated process air or fluid stream.

The embodiments discussed above are representative of the preferred embodiment of the present inventions and are provided for illustrative purposes only. They are not intended to limit the scope or spirit of the invention. Although specific configuration, structure, conditions, etc. have been shown and described, such are not limiting. Modifications and variations are contemplated within the scope of the present invention, as would occur to those skilled in the art.

What is claimed is:

1. A rotary sorption concentrator system comprising:
   a rotary sorption concentrator media;
   means for rotating the media through a cycle of operation;
   means for supplying a process fluid stream containing sorbates and contaminants to be removed by the media to a first isolated treatment zone through which the media rotates and in which the sorbates and contaminants are adsorbed in the media;
   means for supplying a desorption fluid stream at a first temperature range to the media in a second isolated zone through which the media rotates to remove sorbates adsorbed by the media; and
   means for supplying a separate regeneration fluid stream in a third isolated zone at a second temperature range which is at least 600° F. and is higher than said first temperature range for regenerating the media and removing remaining sorbates and contaminants from the media.

2. The system as defined in claim 1 wherein said means for supplying a desorption fluid stream supplies the stream at a temperature range is between 250° F. and 400° F.

3. The system as defined in claim 2 wherein said means for supplying a regeneration fluid stream supplies the stream at a temperature range is between 600° F. and 1000° F.

4. The system as defined in claim 1 including means for providing the exhaust airstream of an oxidizer as the regeneration fluid stream to remove contaminants from the desorption airstream after it passes through said first zone.

5. The system as defined in claim 1 including means for providing the regeneration air stream from a heat source that is independent of the sorption process.

6. The system as defined in claim 1 including means for passing a cooling fluid stream through the media in a fourth zone preceding the first zone and after said second and third zones in the path of rotation of the media in its cycle of operation.

7. The system as defined in claim 6 wherein said means for passing a separate cooling fluid comprises means for providing said cooling fluid stream from said process airstream.

8. The system as defined in claim 6 including means for heating the cooling airstream after it passes through the media and then passing it back into the media at said first temperature range as the desorption airstream.

9. The system as defined in claim 6 including means for supplying the desorption airstream to an oxidizer for removal of the contaminants therein while producing a high temperature oxidizer exhaust stream.

10. The system as defined in claim 1 including means for providing a fourth isolated treatment zone and for supplying a portion of said desorption fluid stream to the media in said fourth zone with said third zone located between first and fourth treatment zones in which desorption occurs.

11. The system as defined in claim 1 wherein said second zone is a single zone and said third zone is embedded in and fully surrounded about its periphery by said second zone.

12. The system as defined in claim 1 wherein said first zone comprises two process zones for adsorbing contaminants by the media and said third zone is located between said two adsorbing zones.

13. The system as defined in claim 1 including means for controlling the speed of rotation of the media.

14. The system as defined in claim 1 including means for adjusting the flow rate of the regeneration fluid stream.

15. A rotary sorption concentrator system comprising: a rotary sorption concentrator media; means for rotating said concentrator media through a cycle of operation; means for supplying a process fluid stream to a first treatment zone in the media for adsorbtion of sorbates in the media; means for supplying a desorption fluid stream to a second treatment zone in said media for desorption of sorbates from the media; and means for passing a separate regeneration fluid stream at a temperature between 600° F. and 1000° F. through the media in a separate first regeneration zone to remove contaminants from the media.

16. The system as defined in claim 15 wherein the means for passing said regeneration fluid stream through the media includes a heat source that is within the sorption process.

17. The system as defined in claim 15 wherein the means for passing said regeneration fluid stream through the media in said first regeneration zone includes a heat source that is independent of the sorption process.

18. The system as defined in claim 15 including means for dividing said regeneration zone into a plurality of radially divided zones.

19. The system as defined in claim 15 including means for dividing said regeneration zone into a plurality of angularly divided zones.

20. The system as defined in either of claims 18 and 19, including means for independently providing said regeneration fluid stream to said divided regeneration zones.

21. The system as defined in claim 15, including means for providing said regeneration fluid stream to the regeneration zone independent of other fluid streams in other rotor treatment zones.

22. The system as defined in claim 15, including means for controlling the speed of rotation of the media.

23. The system as defined in claim 15, including means for adjusting the flow rate of the regeneration fluid stream.

24. The system as defined in claim 15, including means for varying the size of said regeneration zone.

25. The system as defined in claim 15, including means for varying the location of the regeneration zone in the rotor concentrator.

26. The system as defined in claim 15, including means for selectively providing said regeneration fluid stream to said regeneration zone and for supplying another fluid stream of the sorption process to said regeneration zone when the regeneration zone is not being supplied thereto.

27. A rotary sorption concentrator system comprising:
a rotary sorption concentrator media;
means for defining a plurality of rotor treatment zones in the rotary concentrator media;
means for rotating said concentrator media through said plurality of rotor treatment zones in a cycle of operation;
means for supplying a process fluid stream to a first of said rotar treatment zones for the adsorption of sorbates;
means for supplying a desorption fluid stream to a second treatment zone in said media for desorption of sorbates from the media; and
means for passing a regeneration fluid stream at a temperature higher than said heat of the desorption fluid stream and at a temperature in excess of 600° F. through the media in a third of said rotor treatment zones defining a first regeneration zone in which contaminants are removed from the media.

28. The system as defined in claim 27 wherein said plurality of rotor treatment zones includes at least said first and second rotor treatment zones and said first regeneration zone located between said at least first and second rotor treatment zones.

29. The system as defined in claim 27 wherein first said regeneration zone is embedded in and fully surrounded around its periphery by one of said first or second rotor treatment zones.

* * * * *